United States Patent
O'Dea et al.

(10) Patent No.: US 8,886,434 B2
(45) Date of Patent: Nov. 11, 2014

(54) METHOD OF OPERATING AN ELECTRONIC STABILITY CONTROL

(75) Inventors: Kevin A. O'Dea, Ann Arbor, MI (US); Flavio Nardi, Farmington Hills, MI (US); Jihan Ryu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1232 days.

(21) Appl. No.: 12/365,594

(22) Filed: Feb. 4, 2009

(65) Prior Publication Data

US 2010/0198445 A1    Aug. 5, 2010

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *B60B 39/00* | (2006.01) | |
| *B60T 7/12* | (2006.01) | |
| *G05D 1/00* | (2006.01) | |
| *G06F 17/00* | (2006.01) | |
| *B60T 8/24* | (2006.01) | |
| *B60W 30/02* | (2012.01) | |

(52) U.S. Cl.
CPC ................................... *B60W 30/02* (2013.01)
USPC ................... 701/82; 701/71; 701/72; 701/78; 701/70; 701/83

(58) Field of Classification Search
USPC ........... 701/29, 36, 41, 48, 70, 71, 72, 82, 78, 701/83
See application file for complete search history.

(56) References Cited

U.S. PATENT DOCUMENTS

| | | | | |
|---|---|---|---|---|
| 5,732,379 | A | * | 3/1998 | Eckert et al. ................... 701/83 |
| 5,862,503 | A | * | 1/1999 | Eckert et al. ................... 701/78 |
| 6,139,120 | A | * | 10/2000 | Fukada ........................ 303/146 |
| 6,208,920 | B1 | * | 3/2001 | Izawa et al. .................... 701/36 |
| 6,208,927 | B1 | * | 3/2001 | Mine et al. ..................... 701/70 |
| 6,292,735 | B1 | * | 9/2001 | Kimbrough .................... 701/91 |
| 6,370,467 | B1 | * | 4/2002 | Kimbrough .................... 701/71 |
| 6,374,172 | B1 | * | 4/2002 | Yamaguchi et al. ........... 701/90 |
| 6,453,226 | B1 | * | 9/2002 | Hac et al. ....................... 701/48 |
| 6,498,976 | B1 | * | 12/2002 | Ehlbeck et al. ................ 701/70 |
| 6,505,703 | B2 | * | 1/2003 | Stout et al. ................... 180/446 |
| 6,598,946 | B2 | * | 7/2003 | Nagae .......................... 303/190 |
| 7,739,014 | B2 | * | 6/2010 | Lu et al. ......................... 701/48 |
| 2007/0170667 | A1 | * | 7/2007 | Xu et al. ..................... 280/5.507 |

* cited by examiner

*Primary Examiner* — Khoi Tran
*Assistant Examiner* — Nicholas Kiswanto
(74) *Attorney, Agent, or Firm* — Ingrassia Fisher & Lorenz, P.C.

(57) ABSTRACT

A method of stabilizing a vehicle is provided. The vehicle is travelling at a forward speed and a lateral speed, and comprises a lateral acceleration sensor, a yaw sensor adapted to detect an actual yaw rate of the vehicle around a central axis, a steering mechanism adapted to steer the vehicle by a steered yaw rate, and an electronic stability control system. The method comprises determining the forward speed of the vehicle with the electronic stability control system, determining a yaw error rate based upon a difference between the actual yaw rate of the vehicle and the steered yaw rate, determining the vehicle is in an unstable condition by comparing the yaw error rate to a first predetermined yaw rate, computing a calculated lateral speed based on acceleration data from the lateral acceleration sensor, the forward speed, and the actual yaw rate in response to determining the vehicle is in the unstable condition, calculating a correction factor based on the calculated lateral speed of the vehicle and the forward speed of the vehicle, and adjusting operation of the electronic stability control system by the correction factor.

16 Claims, 3 Drawing Sheets

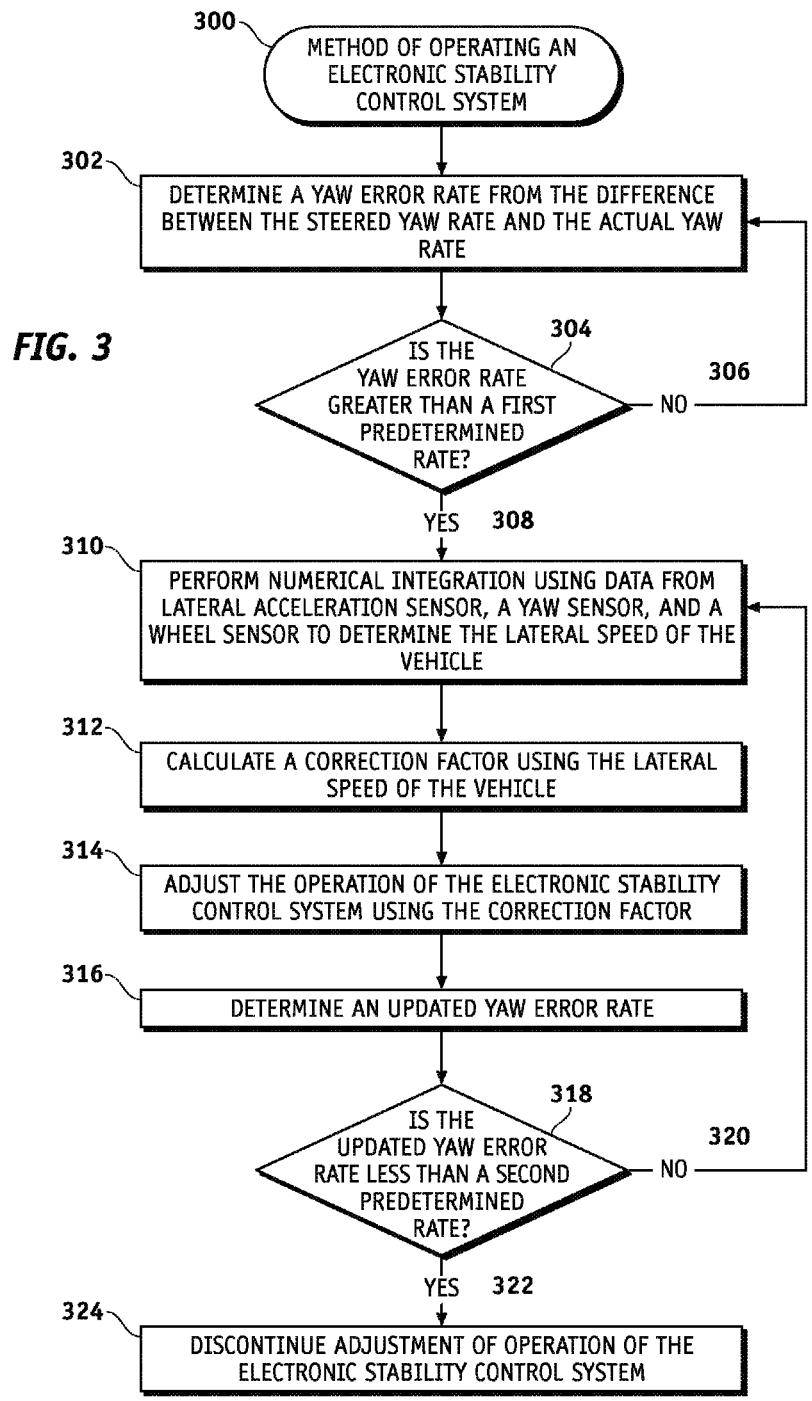

METHOD OF OPERATING AN ELECTRONIC STABILITY CONTROL

TECHNICAL FIELD

Embodiments of the subject matter described herein relate generally to electronic stability control systems for vehicles. More particularly, embodiments of the subject matter relate to numerical integration to determine a lateral speed for use in operation of an electronic stability control system for a vehicle.

BACKGROUND

Vehicles often incorporate an electronic stability control system to assist a driver in maintaining control of the vehicle during certain driving conditions. Electronic stability control systems can augment or adjust the response of the vehicle to input from the driver depending on the detected circumstances. For example, where a surface becomes hazardous due to precipitation or other artificial condition, an electronic stability control system can manipulate the steering or braking systems, together with input from the driver, to retain control of the vehicle in a manner superior to driver input alone.

Electronic stability control systems receive input from a variety of sources, such as driver input from a brake pedal or steering wheel, as well as information regarding the vehicle, such as the rate of rotation of its wheels and/or derived travel speed. Electronic stability control systems can operate in more effective modes when supplied with accurate information regarding the vehicle. For example, when supplied with accurate travel speed information, an electronic stability control system can alter its adjustment of, among other things, the braking system, in response to detecting movement of the steering wheel by the operator. Thus, for a relatively slow-moving vehicle, little to no correction need be applied, whereas a relatively rapidly-moving vehicle will experience a greater amount of correction by the electronic stability control system.

Determining the forward speed of a vehicle from passive sensors can be difficult, however, as compared to detected input such as the operation of a steering device. For example, during situations of challenging operation, the vehicle can be moving in directions other than forward, such as during a turn. As sensors are typically placed so as to detect forward speed of a vehicle, determining the velocity of the vehicle can be difficult.

BRIEF SUMMARY

A method of stabilizing a vehicle is provided. The vehicle is travelling at a forward speed and a lateral speed, and comprises a lateral acceleration sensor, a yaw sensor adapted to detect an actual yaw rate of the vehicle around a central axis, a steering mechanism adapted to steer the vehicle by a steered yaw rate, and an electronic stability control system. The method comprises determining the forward speed of the vehicle with the electronic stability control system, determining a yaw error rate based upon a difference between the actual yaw rate of the vehicle and the steered yaw rate, determining the vehicle is in an unstable condition by comparing the yaw error rate to a first predetermined yaw rate, computing a calculated lateral speed based on acceleration data from the lateral acceleration sensor, the forward speed, and the actual yaw rate in response to determining the vehicle is in the unstable condition, calculating a correction factor based on the calculated lateral speed of the vehicle and the forward speed of the vehicle, and adjusting operation of the electronic stability control system by the correction factor.

Also provided is a method of adjusting the motion of a vehicle travelling at a forward speed and a lateral speed. The vehicle comprises a lateral acceleration sensor, a yaw sensor adapted to detect an actual yaw rate of the vehicle around a central axis, a steering mechanism adapted to steer the vehicle by a steered yaw rate, and an electronic stability control system. The method comprises determining a difference between the steered yaw rate and the actual yaw rate, comparing the difference to a first predetermined yaw rate, determining the vehicle is in an unstable condition when the difference exceeds the first predetermined yaw rate, computing a calculated lateral speed based on acceleration data from the lateral acceleration sensor, the actual yaw rate, and the forward speed in response to determining the vehicle is in an unstable condition, wherein computing the calculated lateral speed comprises performing numerical integration of the acceleration data, the actual yaw rate, and the forward speed, calculating a correction factor based on the calculated lateral speed and the forward speed of the vehicle, and adjusting operation of a braking system of the vehicle with the electronic stability control system by the correction factor.

A stability control system for a vehicle is also provided. The vehicle comprises a wheel and the system comprises a wheel sensor adapted to determine a rotation rate of the wheel, a vehicle yaw sensor adapted to determine a rotation rate of the vehicle about a central axis, a lateral acceleration sensor adapted to detect the acceleration of the vehicle in a direction lateral to the direction of forward travel of the vehicle at a first periodic rate, a steering device adapted to alter the direction of travel of the vehicle in response to adjustment of its position by an operator of the vehicle, a steering sensor adapted to detect the position of the steering device and a rate of change of position of the steering device, an electronic stability control system coupled to the vehicle yaw sensor and to the steering sensor. The electronic stability control system is adapted to receive a first signal from the vehicle yaw sensor, receive a second signal from the steering sensor, and determine the vehicle is in an unstable condition in response to receiving the first and second signals, and calculate a lateral speed of the vehicle using the first signal, a third signal from the wheel sensor, and a fourth signal from the lateral acceleration sensor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 is a schematic illustration of a method of operating an electronic stability control system.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. One or more processor devices can carry out the described operations, tasks, and functions. It should be appreciated that the various block components shown in the figures may be realized by any number of hardware, software, and/or firmware components configured to perform the specified functions.

Figure 1:
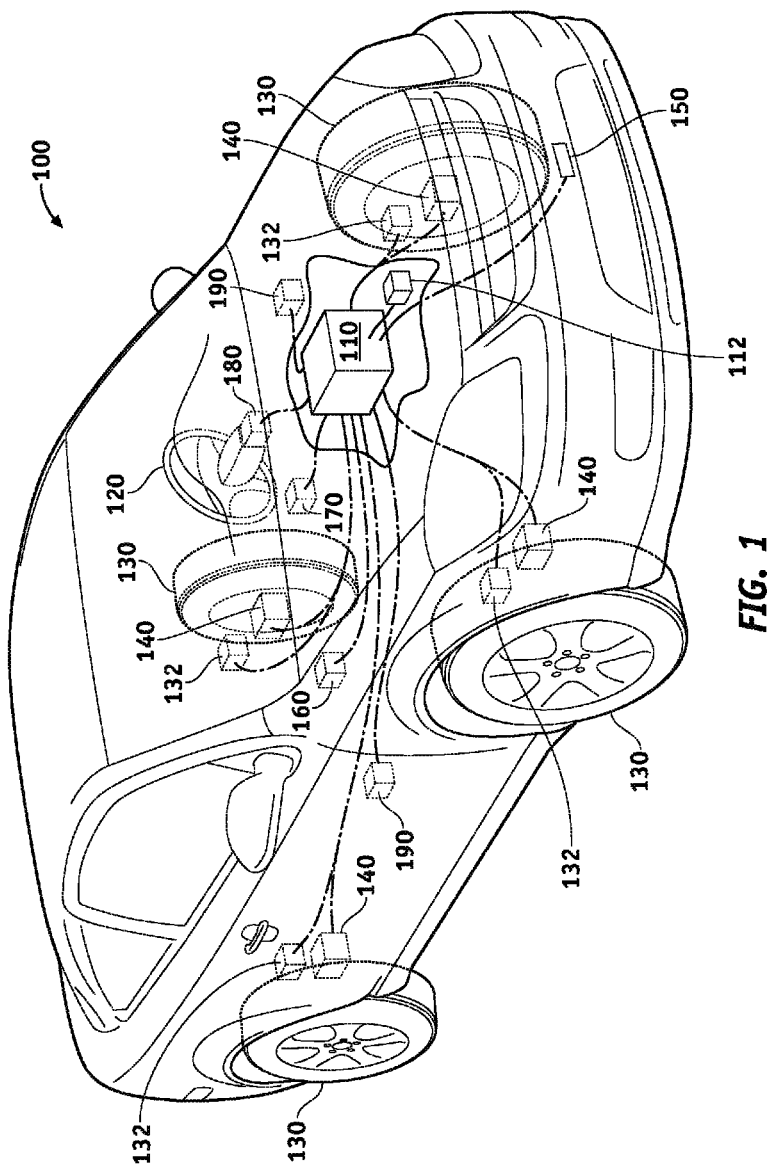
FIG. 1 is a schematic of an embodiment of a vehicle with an electronic stability control system.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "right," "left," "above," and "below" refer to directions in the drawings to which reference is made. Terms such as "front," "back," "rear," and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context.

The connecting and/or coupling lines shown in the various figures contained herein are intended to represent exemplary functional relationships and/or physical couplings between the various elements. It should be noted that many alternative or additional functional relationships or physical connections may be present in an embodiment of the subject matter.

FIG. 1 illustrates an embodiment of a vehicle 100 comprising an electronic stability control system (ESCS) 110. The vehicle 100 also comprises a steering mechanism, illustrated here as a steering wheel 120, and a plurality of wheels 130. A braking system 140 can be coupled to each of the plurality of wheels 130. The braking system 140 can be coupled to the ESCS 110, as well as other vehicular components for operation by the driver. The ESCS 110 can be further coupled to a plurality of sensors, including a yaw sensor 112, wheel sensors 132, a forward acceleration sensor 150, a brake pedal sensor 160 coupled to the brake pedal of the vehicle 100, an accelerator pedal sensor 170 coupled to the accelerator pedal of the vehicle 100, a steering sensor 180 coupled to the steering wheel 120, and lateral acceleration sensors 190.

The ESCS 110 can receive input from the various sensors and perform operations to determine the forward and lateral speeds of the vehicle. With the lateral speed of the vehicle 100 determined from the lateral acceleration sensors 190, the ESCS 110 can operate each of the braking systems 140 in an appropriate manner to improve control and stability of the vehicle 100 superior to operation of the ESCS 110 relying solely upon forward speed information.

The ESCS 110 preferably includes or cooperates with a system controller that is coupled to the various sensors spread through the vehicle 100. The ESCS 110 can receive input from the sensors, including those indicative of the vehicle's state, as well as sensors providing input regarding operational decisions and commands from the operator, such as pressure on the brake pedal or rotation of the steering wheel 120. The ESCS 110 can evaluate the input received and, if appropriate to improve the stability and predictable operation of the vehicle 100, respond in a variety of ways.

For example, in response to detecting heavy braking via pressure on the brake pedal, the ESCS 110 can operate an anti-lock braking system (not shown) to prevent loss of control of the vehicle. As another example, during intervals of sharp steering and braking, the ESCS 110 can adjust the operation of one or more of the braking systems 140 independently, potentially resulting in differing braking forces being applied to different wheels 130 of the vehicle 100. Preferably, the variable braking forces are applied to increase stability and responsiveness of the vehicle 100.

Additionally, the ESCS 110 can perform some or all of the described operations itself, or can cooperate with another controller of the vehicle 100. For example, the ESCS 110 can receive sensor data directly, or in certain embodiments, a separate controller component can receive the sensor data and relay it to the ESCS 110. Thus, while some computation and evaluation functions are described as being performed by the ESCS 110, they also can be performed by a separate component, and the results provided to the ESCS 110 for action to be taken, depending on the results. Accordingly, while computation and comparison steps or methods may be described in relation to the ESCS 110, the ESCS 110 can, in various embodiments, perform all, some, or none of the steps, while still performing operations in response to the computations or comparisons produced.

Additionally, the ESCS 110 can be comprised of one or more processor-based devices, which may be physically integrated into a single component or circuit board. In certain embodiments, the ESCS 110 can be distributed throughout the electronic and/or computing architecture of the vehicle 100, including integration with components performing additional functions.

The yaw sensor 112 is preferably a sensor adapted to determine the actual rate of change of angle of the vehicle 100 about a central axis. The actual yaw rate of the vehicle 100 can be different than the steered, commanded, or driver-indicated yaw rate, as described below. The yaw sensor 112 can be physically offset from the center of the vehicle 100 and adjust its readings to compensate for the physical distance. The yaw sensor 112 can be an accelerometer, or any other type of sensor suitable to determine the rotation rate of the vehicle 100. Thus, although the yaw sensor 112 can be one of the sensor types described below, other sensor types can be used, without limitation. The yaw sensor 112 is preferably coupled to the ESCS 110 such that it can provide information to the ESCS 110.

The steering wheel 120 is representative of a steering mechanism, and can be embodied in different forms for different vehicles, if desired. The steering wheel 120 is preferably coupled to a steering sensor 180. The steering sensor 180 is any sensor capable of detecting the rotational position of the steering wheel 120. Preferably, the steering sensor 180 is also capable of detecting the rotational speed of the steering wheel 120, in any suitable measure, such as degrees per second, rotations per second, and so on. The steering sensor 180 can comprise, for example, a potentiometer coupled to the steering wheel 120 and/or steering column of the vehicle 100. Rotation of the steering wheel 120 can be detected continuously by the steering sensor 180, which can supply information regarding both the rotational speed of the steering wheel 120 as well as the position of the steering wheel 120 to the ESCS 110.

The operator of the vehicle 100 is capable of creating a steered yaw rate by rotating the steering wheel 120. The steered yaw rate is defined as the desired yaw, or turning, or the vehicle 100 indicated by or otherwise derived from the amount of rotation of the steering wheel 120. For example, a steering wheel rotated 90° from a rest position represents a smaller steered yaw rate than a steering wheel rotated 270° from the rest position. The vehicle 100 preferably responds to the steered yaw rate by aligning the wheels 130 to cause the vehicle 100 to travel at least partially to the side, thereby altering the direction of travel. The steered yaw rate, as well as the actual yaw rate, is described in greater detail with respect to FIG. 2 below.

The wheels 130 are of any size and/or type appropriate for use by the vehicle 100. A wheel sensor 132 is preferably coupled to each wheel 130 and adapted to detect the rate of rotation of the wheel 130 to which it is coupled. The wheel sensors 132 can provide information indicating either the rotational rate of the wheel, or an estimated speed of the vehicle 100 based on the rotational rate, as appropriate and desired for the embodiment.

Each wheel 130 is preferably affected by a braking system 140. The braking systems 140 can be any type of braking system, such as a disc braking system, or a drum braking system. Preferably, the braking systems 140 are uniform throughout the vehicle 100. Each braking system 140 can be coupled to a wheel 130, and can reduce the rotational speed of the wheel 130. The braking systems 140 are preferably independently operable, as described above.

Each braking system 140 is preferably responsive to the driver's operation of the brake pedal of the vehicle 100. Additionally, each individual braking system 140 can be coupled to, and controlled by, the ESCS 110. The ESCS 110 can adjust the operation of a braking system 140 to leave the driver's operation unchanged, to reduce the amount of braking force applied by the braking system 140 to below the amount normally resulting from the driver's operation, and to increase the amount of braking force applied by the braking system 140 to an amount greater than the amount normally resulting from the driver's operation. Accordingly, the ESCS 110 can perform more sophisticated braking procedures than the driver can accomplish with the brake pedal.

The ESCS 110 can also be coupled to the brake pedal sensor 160, which can detect the position of the brake pedal. In certain embodiments, the brake pedal sensor 160 can additionally detect the travel speed over time of the brake pedal. Accordingly, the ESCS 110 can receive information from the brake pedal, as well as adjusting the braking force supplied by the braking systems 140 in response to manipulation of the brake pedal by the operator. Similarly, the vehicle 100 can comprise an accelerator pedal sensor 170 coupled to the accelerator pedal. The accelerator pedal sensor 170 can perform similar detecting functions to the brake pedal sensor 160, except for the accelerator pedal. The accelerator pedal sensor 170 can be coupled to the ESCS 110 and provide it information.

Where sensors are described, they are described functionally. The quantity being measured is used descriptively in the name, and should be understood that this information is derived from signals generated by the sensor in response to its detecting functions, regardless of where they are processed to determine the detected quantity. An acceleration sensor will be described for exemplary purposes. The acceleration sensor can generate a voltage which varies according to the acceleration the sensor experiences. In some embodiments, the acceleration sensor can provide the voltage to another system, such as the ESCS 110, which will perform operations to determine the acceleration to which the voltage level corresponds. In other embodiments, the acceleration sensor can perform the operations internally. In such embodiments, the acceleration sensor will provide a signal indicating the acceleration directly, instead of the voltage level. In certain embodiments, the acceleration sensor can provide both the signal indicating acceleration, as well as the voltage to other components. Thus, for sensors described throughout, the sensor can perform in any of these modes, as appropriate and/or desired for the embodiment.

Additionally, sensors described herein perform at a sampling rate, which is preferably fast. For example, the exemplary acceleration sensor can provide a signal or voltage indicating its sensed quantity at a sampling rate of 10 milliseconds, though the sampling rate can be higher or lower for certain sensors. Preferably, a faster sampling rate is used where possible, to provide a signal as closely approximating real-time conditions as possible.

The vehicle 100 can comprise a forward acceleration sensor 150 coupled to the ESCS 110. Preferably, the forward acceleration sensor 150 detects the acceleration of the vehicle in its forward direction. The forward acceleration sensor 150 can be of any suitable type, such as a piezoresistive accelerometer, as well as any other appropriate type, including microelectromechanical systems (MEMS) devices. The forward acceleration sensor 150 is preferably positioned and configured to detect acceleration of the vehicle 100 and supply information regarding the acceleration of the vehicle 100 to the ESCS 110.

Lateral acceleration sensors 190 can also be disposed in the vehicle 100. The lateral acceleration sensors 190 are preferably positioned within the vehicle 100 to detect its acceleration to the side, perpendicular to its forward motion. Thus, as shown, the lateral acceleration sensors 190 are positioned along the sides of the vehicle 100. The lateral acceleration sensors 190 can be an accelerometer of the types described above with reference to the forward acceleration sensor 150. The lateral acceleration sensors 190 can be the same type of accelerometer as the forward acceleration sensor 150, or different. Preferably, the lateral acceleration sensors 190 are coupled to the ESCS 110 and provide information to the ESCS 110 related to detected lateral acceleration.

Figure 2:
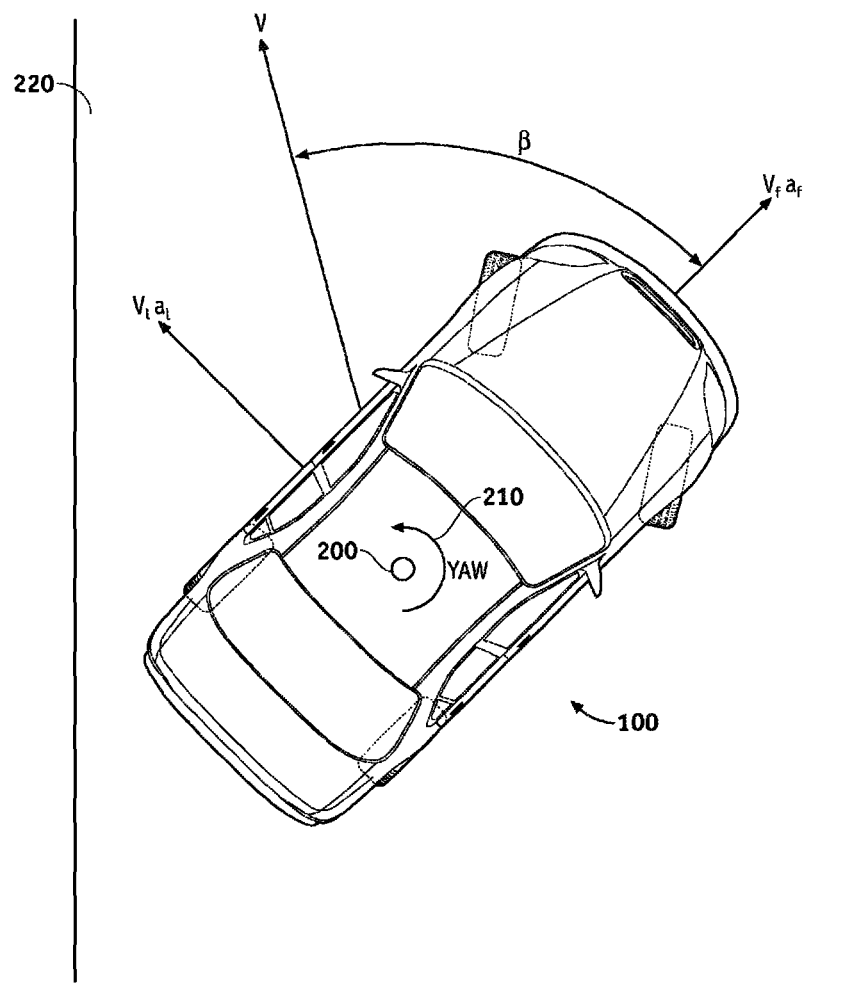
FIG. 2 is a diagram that illustrates motion of a vehicle during operation.

FIG. 2 illustrates the vehicle 100 in operation. The vehicle 100 is shown with directional arrows indicating vectorial components of the vehicle's 100 acceleration ($a_f$, $a_l$) and velocity V ($v_f$, $v_l$). The actual yaw rate 210 of the vehicle 100 about a central axis 200 is also shown. The illustration, including vector lengths, is not to scale, and is used for descriptive purposes only.

In the illustrated embodiment, the vehicle 100 is shown sliding during a turn. The vehicle 100 is travelling at a certain speed in the direction of V. The vectorial components of V are $v_f$ and $v_l$ which represent the forward and lateral velocity components, respectively. The velocity components are oriented relative to the vehicle 100. That is, "forward" indicates forward of the vehicle 100, and "lateral" indicates the side of the vehicle 100, perpendicular to the forward direction. Thus, although the vehicle 100 is turned to the right, relative to its down-road velocity, it is travelling substantially forward, such as during a hydroplaning event. As can be seen, the actual yaw rate 210 of the vehicle 100 is toward the left. The actual yaw rate 210 is the rotation of the vehicle 100 around the central axis 200, in degrees per second.

The driver, then, is steering the wheels towards the left to re-align the orientation of the vehicle 100 with its velocity V. The yaw rate that would be produced by the driver's turning of the steering wheel is the steered yaw rate, as opposed to the actual yaw rate 210, which can be different than the steered yaw rate due to a variety of circumstances.

Additionally, the vehicle 100 is undergoing acceleration in the forward and lateral directions, $a_f$ and $a_l$, respectively. The acceleration can result from braking, acceleration of the vehicle 100 by the operator, friction from the ground, or any other source. Although the arrows indicate directions, the vectors can have negative values, indicating acceleration in the opposite direction to the one shown. The angle between the velocity V and the forward velocity $v_f$ is designated β. Acceleration vectorial components are also described in reference to the orientation of the vehicle 100.

The ESCS 110 can function more effectively if it can determine the forward and lateral speeds of the vehicle 100, instead of simply the forward speed. In certain embodiments of the vehicle 100, the ESCS 110 can receive information from the forward 150 and lateral 190 acceleration sensors, as well as the steering sensor 180, and execute operations to improve the performance of the vehicle 100. FIG. 3 illustrates the steps of such a method.

The various tasks performed in connection with method 300 may be performed by software, hardware, firmware, or any combination thereof. For illustrative purposes, the following description of method 300 may refer to elements mentioned above in connection with FIGS. 1 and 2. In practice, portions of method 300 may be performed by different elements of the described vehicle, e.g., ESCS 110, lateral acceleration sensors 190, or another component, such as a vehicle electronic control system. It should be appreciated that method 300 may include any number of additional or alternative tasks, the tasks shown in FIG. 3 need not be performed in the illustrated order, and method 300 may be incorporated into a more comprehensive procedure or process having additional functionality not described in detail herein.

Method 300 illustrates the steps of operating the ESCS 110 to improve the performance of the vehicle 100 during operation under certain conditions. References to specific components from the exemplary embodiment described in FIGS. 1 and 2 is for illustrative purposes only, and other components of different vehicles can perform the steps of the method as well.

When the vehicle 100 is traveling with lateral speed, the ESCS 110 can augment stability of the vehicle 100 via the braking systems 140. To perform this function effectively, preferably the ESCS 110 is provided with the lateral speed of the vehicle 100, or receives input from sensors from which it can perform operations to determine the lateral speed. To determine that the vehicle 100 is operating in circumstances in which it is likely to have lateral speed, information from the steering sensor 180 and yaw sensor 112 is considered. The yaw sensor 112 provides information regarding the actual yaw rate of the vehicle 100. By contrast, the steering sensor 180 determines the steered yaw rate of the vehicle 100. The steered yaw rate of the vehicle 100 results from direction of the operator, and is the amount of yaw desired, as detected from manipulation of the steering wheel 120.

The difference between the steered yaw rate and the actual yaw rate is the yaw error rate, also expressed in degrees of rotation of the vehicle per second. The yaw error rate indicates the magnitude by which the driver is attempting to turn the vehicle, but which the vehicle 100 has not turned. In certain driving conditions, such as the one illustrated in FIG. 2, the yaw error rate can be large, as the driver continues to turn the steering wheel 120 to change the orientation of the vehicle 100, while the vehicle 100 does not turn. The ESCS 110 can use information from the yaw sensor 112 and the steering sensor 180 to calculate the yaw error rate (task 302).

By calculating the yaw error rate over time, the ESCS 110 can determine whether the yaw error rate exceeds a predetermined value (task 304). The predetermined value, or predetermined yaw error rate can be configured individually for each vehicle. Some exemplary predetermined yaw error rates can include 3°/second of error, or 4°/second of error. Error here indicates a discrepancy between the steered and actual yaw rates, and not uncertainty in calculating or detecting either. Other rates can be used by different embodiments of the vehicle 100. Thus, if the steered yaw rate was 8°/second, while the vehicle's actual yaw rate was only 1°/second, the yaw error rate would be 7°/second, in excess of the exemplary threshold rates.

When the yaw error rate exceeds the predetermined yaw error rate, the ESCS 110 can incorporate the lateral speed of the vehicle 100 into calculations for control of the braking systems 140. When the yaw error rate exceeds the predetermined yaw error rate, the vehicle is considered to be in an unstable condition. The condition persists until the yaw error rate is less than the second predetermined yaw error rate, as described below. In the event that the determined yaw error rate is less than the predetermined yaw error rate (step 306), the ESCS 110 can continue to perform yaw error rate comparisons without adjusting its operation.

However, when the yaw error rate exceeds the predetermined yaw error rate (step 308), the ESCS 110 can perform certain operations to include the lateral speed in its calculations, described below and referred to as adjusted operation of the ESCS 110. The ESCS 110 can receive acceleration data from the lateral acceleration sensors 190 and yaw rate data from the yaw sensor 112. Together with the forward velocity, $v_f$, which can be obtained from the wheel sensors 132, the ESCS 110 can determine the numerical values of the derivative of the lateral velocity of the vehicle 100 using the kinematic equation. In the kinematic equation, which is well known in the art, the lateral velocity derivative is equal to the lateral acceleration, $a_l$, minus the product of the forward velocity, $v_f$, and the yaw rate. The ESCS 110 can then perform numerical integration of the values of the derivative of the lateral velocity to approximate the lateral velocity of the vehicle 100 (step 310).

When referring to "numerical integration", it is to be understood that certain steps, including the determination of the derivative of the lateral velocity from the lateral acceleration data, the yaw rate data, and the forward velocity data, are included in the operation, for purposes of convenience of reference. Accordingly, reference to numerical integration should be understood to include those steps necessary to perform numerical integration of the data from the sensors for the purpose of approximating the lateral velocity.

Numerical integration can be performed because the value for a sample time can be provided from the lateral acceleration sensors 190 to the ESCS 110. Additionally, the sampling rate of the lateral acceleration sensors 190 can be provided to the ESCS 110 as part of its configuration. Thus, with the sampling rate and values of each sample period, the ESCS 110 can determine, or nearly approximate the lateral speed of the vehicle 100. Numerical integration can be performed using other techniques, if desired, to determine the lateral speed of the vehicle 100.

The lateral speed of the vehicle 100 can be useful to the ESCS 110 in determining a correction factor for its operation. Because a portion of the acceleration the ESCS 110 is detecting and managing is causing a lateral acceleration, and thus, lateral velocity, the ESCS 110 adjusts its operation to compensate. The correction factor can be one way in which the ESCS adjusts its operation and, as a result, its operation of the braking systems 140. The correction factor can be a multiplier by which the braking force is scaled, either smaller or larger to compensate for lateral velocity. The correction factor can be calculated from values or ratios of the vehicle and its operation. For example, one correction factor can include a ratio of lateral speed to forward speed, or the ratio of lateral acceleration to forward acceleration, or a combination thereof. The ratios can themselves be scaled by a constant value, as appropriate to, and configured for, the operation of the embodiment.

Thus, one correction factor can be the ratio of lateral speed to forward speed multiplied by a constant value. When the lateral speed increases, the correction factor can increase, resulting in greater force applied by the braking systems as a result of a greater lateral speed. The constant value can scale the ratio such that even small lateral speeds results in a significant additional braking force. Similarly, a small constant value can scale the ratio such that large lateral speeds are required to significantly affect the braking force. A different correction factor can be determined and used for different embodiments of the vehicle 100, as appropriate to the vehicle's size, weight, and other characteristics.

After determining the correction factor, the ESCS 110 can adjust its operation, including its operation of the braking systems 140 in response (task 314). Preferably, the adjustment includes a value from the correction factor. Modified operation of the braking systems 140 can result in a decrease of the yaw error rate.

Accordingly, the yaw error rate can be evaluated again by the ESCS 110. Preferably, the yaw error rate can be continuously monitored, and although the evaluation is described following modified operation of the ESCS 110, the evaluation and subsequent steps can take place at any time, including during determination of the correction factor, as well as prior to its implementation via the braking systems 140.

An updated yaw error rate can be determined in a manner similar to the previous yaw error rate (task 316). The yaw error rate can then be compared to a second yaw predetermined error rate (task 318). The second predetermined yaw error rate is preferably smaller, or the same value as, the first predetermined yaw error rate of task 304. Thus, in some circumstances, the yaw error rate may be large enough to begin adjusted operation of the ESCS 110, as described, and can decrease thereafter. Some exemplary second predetermined yaw error rate values can include 1°/s, 1.5°/s, or 2°/s., though any desired value can be used.

If the yaw error rate does not decrease below the second yaw error rate, however, the adjusted operation, including lateral speed determination, can continue. Accordingly, the adjusted operation of the ESCS 110 with the control factor can continue to a lower yaw error rate than would be sufficient to begin the adjusted operation. In this way, the vehicle 100 can be restored to stability prior to discontinuing adjusted operation of the ESCS 110. In certain embodiments, the first and second predetermined yaw error rates can be the same, and in any embodiment, both the first and second predetermined yaw error rates can be configured for specificity to the embodiment.

When the yaw error rate does not decrease below the second predetermined yaw error rate, the ESCS 110 can continue adjusted operation (step 320). If the yaw error rate does decrease below the second predetermined yaw error rate (step 322), the ESCS 110 can discontinue its adjusted operation (task 324). Thereafter, the ESCS 110 can no longer adjust its operation by a correction factor, or perform other steps associated with adjusted operation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of stabilizing a vehicle travelling at a forward speed and a lateral speed, the vehicle comprising a lateral acceleration sensor, a yaw sensor adapted to detect an actual yaw rate of the vehicle around a central axis, a steering mechanism adapted to steer the vehicle by a steered yaw rate, and an electronic stability control system, the method comprising:

determining the forward speed of the vehicle with the electronic stability control system;

determining a yaw error rate based upon a difference between the actual yaw rate of the vehicle and the steered yaw rate;

determining the vehicle is in an unstable condition when the yaw error rate is greater than a first predetermined yaw rate;

computing a calculated lateral speed based on acceleration data from the lateral acceleration sensor, the forward speed, and the actual yaw rate in response to determining the vehicle is in the unstable condition, wherein the calculated lateral speed corresponds to a lateral velocity component of the vehicle that is oriented perpendicular to a longitudinal axis of the vehicle;

calculating a correction factor based on the calculated lateral speed of the vehicle and the forward speed of the vehicle, wherein the correction factor is a ratio of the calculated lateral speed to the forward speed; and adjusting operation of a braking system of the vehicle with the electronic stability control system using the correction factor, until an updated yaw error rate is less than a second predetermined yaw rate.

2. The method of claim 1, wherein the steering mechanism comprises a steering sensor and determining the yaw error rate comprises detecting the steered yaw rate using the steering sensor.

3. The method of claim 1, wherein computing the calculated lateral speed comprises performing numerical integration of the acceleration data, forward speed, and actual yaw rate.

4. The method of claim 3, wherein computing the calculated lateral speed of the vehicle based on acceleration data from the lateral acceleration sensor, forward speed, and actual yaw rate comprises:

calculating a plurality of values of a derivative of the lateral speed; and calculating a sum of the plurality of values of the derivative of the lateral speed measured, each multiplied by the interval of time, the calculation performed while the vehicle is in the unstable condition.

5. The method of claim 1, wherein the first predetermined yaw rate is greater than the second predetermined yaw rate.

6. A method of adjusting the motion of a vehicle travelling at a forward speed and a lateral speed, the vehicle comprising a lateral acceleration sensor, a yaw sensor adapted to detect an actual yaw rate of the vehicle around a central axis, a steering mechanism adapted to steer the vehicle by a steered yaw rate, and an electronic stability control system, the method comprising:

determining a difference between the steered yaw rate and the actual yaw rate to obtain a yaw error rate;

comparing the yaw error rate to a first predetermined yaw rate;

determining the vehicle is in an unstable condition when the yaw error rate exceeds the first predetermined yaw rate;

computing a calculated lateral speed based on acceleration data from the lateral acceleration sensor, the actual yaw rate, and the forward speed in response to determining the vehicle is in an unstable condition, wherein the calculated lateral speed corresponds to a lateral velocity component of the vehicle that is oriented perpendicular to a longitudinal axis of the vehicle, and wherein computing the calculated lateral speed comprises performing numerical integration of the acceleration data, the actual yaw rate, and the forward speed;

calculating a correction factor based on the calculated lateral speed and the forward speed of the vehicle, wherein the correction factor is a ratio of the calculated lateral speed to the forward speed; and adjusting operation of a braking system of the vehicle with the electronic stability control system by the correction factor, until an updated yaw error rate is less than a second predetermined yaw rate, wherein the first predetermined yaw rate is greater than the second predetermined yaw rate.

7. The method of claim 6, wherein adjusting operation of the braking system with the electronic stability control system by the correction factor comprises determining a ratio of the calculated lateral speed to the forward speed.

8. The method of claim 7, wherein adjusting operation of the braking system by the correction factor comprises scaling the ratio by a constant amount.

9. The method of claim 6, further comprising:

repeating a comparison of a difference between the steered yaw rate and the actual yaw rate to the second predetermined yaw rate while adjusting operation of the electronic stability control system; and discontinuing adjustment of operation of the electronic stability control system in response to determining the difference between the steered yaw rate and actual yaw rate is below the second predetermined yaw rate.

10. The method of claim 6, wherein the vehicle comprises a plurality of wheel assemblies coupled to the braking system and operating the braking system with the electronic stability control system comprises commanding a first amount of braking force for a first of the plurality of wheel assemblies and a second amount of braking force to a second of the plurality of wheel assemblies.

11. The method of claim 10, wherein the first and second amounts of braking force are determined using the correction factor.

12. A stability control system for a vehicle comprising a wheel, the system comprising:

a wheel sensor adapted to determine a rotation rate of the wheel;

a vehicle yaw sensor adapted to determine a rotation rate of the vehicle about a central axis;

a lateral acceleration sensor adapted to detect the acceleration of the vehicle in a direction lateral to the direction of forward travel of the vehicle at a first periodic rate;

a steering device adapted to alter the direction of travel of the vehicle in response to adjustment of its position by an operator of the vehicle;

a steering sensor adapted to detect the position of the steering device and a rate of change of position of the steering device;

an electronic stability control system coupled to the vehicle yaw sensor and to the steering sensor, and adapted to:

receive a first signal from the vehicle yaw sensor, receive a second signal from the steering sensor, and determine the vehicle is in an unstable condition when a yaw error rate calculated in response to the first and second signals is greater than a first predetermined yaw rate;

calculate a lateral speed of the vehicle using the first signal, a third signal from the wheel sensor, and a fourth signal from the lateral acceleration sensor, wherein the calculated lateral speed corresponds to a lateral velocity component of the vehicle that is oriented perpendicular to a longitudinal axis of the vehicle;

calculate a correction factor based on the calculated lateral speed of the vehicle and a forward speed of the vehicle, wherein the correction factor is a ratio of the calculated lateral speed to the forward speed; and adjust operation of the electronic stability control system using the correction factor, until an updated yaw error rate is less than a second predetermined yaw rate.

13. The vehicle of claim 12, wherein the electronic stability control system is further adapted to calculate the lateral speed using numerical integration of signals from the wheel sensor, yaw sensor, and lateral acceleration sensor.

14. The vehicle of claim 12, further comprising:
a plurality of wheel assemblies adapted to support the vehicle and to alter its direction of travel; and
a braking system coupled to at least one of the plurality of wheel assemblies; wherein the electronic stability control system is adapted to operate the braking system in response to determining the vehicle is in the unstable condition.

15. The vehicle of claim 14, wherein the braking system is coupled to at least two of the plurality of wheel assemblies, and the electronic stability control system is adapted to operate the braking system by commanding different amounts of braking force to each of the at least two of the plurality of wheel assemblies.

16. The vehicle of claim 12, wherein the electronic stability control system is further adapted to receive a fifth signal from the vehicle yaw sensor, receive a sixth signal from the steering sensor, and determine the vehicle is in a stable condition in response to receiving the fifth and sixth signals.

* * * * *